US006442859B1

(12) United States Patent
Hinzpeter et al.

(10) Patent No.: US 6,442,859 B1
(45) Date of Patent: Sep. 3, 2002

(54) METHOD FOR DETERMINING THE POSITION OF A PUNCH OF A POWDER PRESS

(75) Inventors: Jürgen Hinzpeter; Ingo Schmidt, both of Schwarzenbek; Jörg Reitberger; Ulrich Gathmann, both of Hamburg; Klaus Peter Rüssmann; Thomas Pannewitz, both of Schwarzenbek; Stephan Mallon, Gülzow; Alexander Oldenburg, Dassendorf, all of (DE)

(73) Assignee: Wilhelm Fette GmbH, Schwarzenbek (DE)

( * ) Notice: Subject to any disclaimer, the term of this patent is extended or adjusted under 35 U.S.C. 154(b) by 0 days.

(21) Appl. No.: 09/551,275

(22) Filed: Apr. 18, 2000

(30) Foreign Application Priority Data

Apr. 30, 1999 (DE) ........................................ 199 19 693

(51) Int. Cl.[7] ............................ G01B 7/30; B21D 22/00

(52) U.S. Cl. ........................................... 33/645; 33/627

(58) Field of Search .......................... 33/613, 626, 627, 33/628, 638, 642, 645

(56) References Cited

U.S. PATENT DOCUMENTS

| | | | | |
|---|---|---|---|---|
| 2,542,938 A | * | 2/1951 | Morris | 33/626 |
| 4,103,413 A | * | 8/1978 | Malmberg | 33/627 |
| 4,397,094 A | * | 8/1983 | Nakamura | 33/627 |
| 4,485,660 A | * | 12/1984 | Takeuchi et al. | 33/627 |
| 4,494,455 A | * | 1/1985 | Schoch | 33/627 |

FOREIGN PATENT DOCUMENTS

| | | |
|---|---|---|
| DE | 34 25 221 C2 | 6/1993 |

* cited by examiner

*Primary Examiner*—G. Bradley Bennett
(74) *Attorney, Agent, or Firm*—Faegre & Benson LLP

(57) ABSTRACT

A method for determining the position of a punch with respect to a die in a powder press with the following steps:

Figure 1:
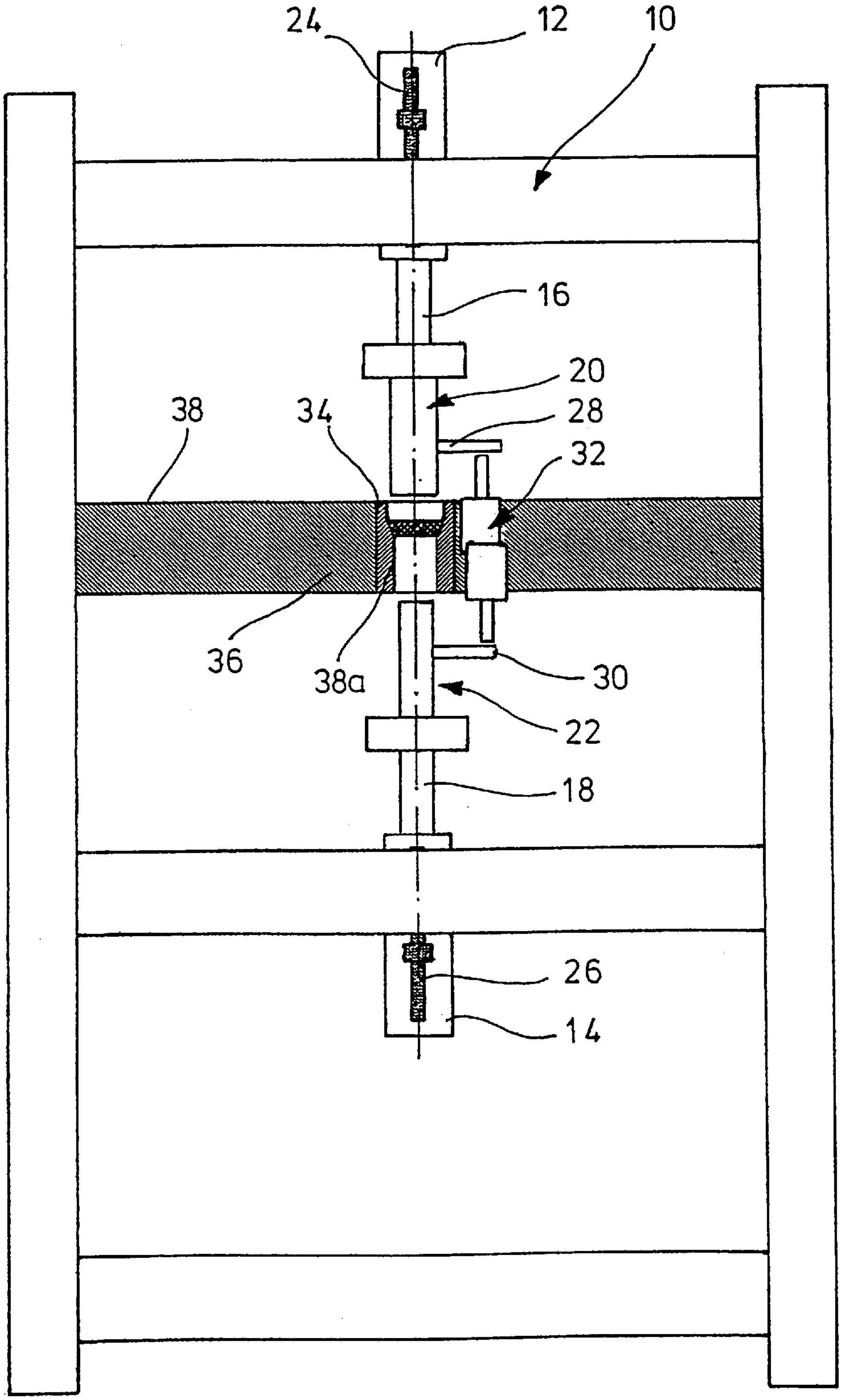

storing a reference measure in a computer corresponding to a predetermined relatively small distance of the punch to the upper edge or lower edge of the die, storing a reference offset in the computer by counting the pulses of an incremental path sensor actuated by the punch on raising the punch from the reference measure to an index pulse, measuring the position of the punch above the reference offset using an absolute path sensor which evaluates the path of the adjusting piston for the punch and whose readings are inputted into the computer, and inputting the pulses of the incremental path sensor into the computer as soon as the actual position of the punch is equal or smaller than the sum measure of the reference offset and the reference measure.

2 Claims, 2 Drawing Sheets

METHOD FOR DETERMINING THE POSITION OF A PUNCH OF A POWDER PRESS

The invention relates to a method for determining the position of a punch of a powder press, preferably a metal powder press, with respect to a die.

For the manufacture of pressed parts which are accurate to size the positioning accuracy of the upper and lower punch of a powder press, for example a metal powder press is of importance. An accuracy of <0.01 mm is to be maintained.

It is known to obtain a path measurement in that the path of the piston of a hydraulic punch, which actuates the punch, is acquired. On account of the forces occurring on pressing there occurs a resiliency of the machine frame. The measured values therefore no longer correspond to the actual ones. If the die is coniform, a deflection of the die table also occurs.

It is therefore the object of the invention to specify a method for determining the position of a punch of a powder press which functions accurately and is largely independent of deformations of the press on account of the pressing forces.

This object is achieved by the features of the present invention.

With the method according to the invention two path sensors are used. The upper and lower punch comprise a so-called path sensor system which may function in a conventional manner. It functions with a relatively low accuracy for the coarse traversing region, wherein a measuring accuracy of 0.01 mm is sufficient.

Furthermore with the method according to the invention an incremental path sensor is used which e.g. has a measuring accuracy of 0.25 μm. This is actuated directly by the punch, for example via an extension arm on the punch. The measuring range of such an incremental transducer is relatively short. It is sufficient when the position determination is effected with the help of the incremental transducer shortly before the plunging of the punch into the die.

Furthermore it is essential that the switching-over from the one path sensor to the other path sensor with a high traversing speed, of e.g. 500 mm/sec, is effected without jerking, without position losses and without losses of accuracy. For this purpose in the computer in which the readings are processed a reference measure is stored. This reference measure gives the predetermined distance of the punch to the die upper edge or die lower edge. The measure may be obtained in that a suitable gauge is arranged between the punch and the die table and the punch is traversed against the gauge with a very low speed. Since the distance measure is known, in the computer it may be stored as a reference measure. In the computer further a so-called reference offset is stored. It is obtained in that the punch from the reference measure is traversed away from the die and the number of pulses are counted which are produced up to the reaching of a so-called index pulse. The indexing is effected with the help of the incremental path sensor. If therefore during the pressing procedure from the incremental path sensor which is only actuated near to the reaching of the reference offset, the index pulse is triggered, the distance between the punch and the die is known and the incremental path sensor may then with the continuation of the pressing procedure indicate the position of the punch. If the number of pulses, which results from the sum of the reference measure and reference offsets, has been covered, the number of the pulses following this corresponds to the respective position of the punch in the die bore. According to one formation of the invention in a counter the number of pulses which are produced with the traversing of the punch from the reference measure towards the reference offset is stored. In a second counter the respective actual position is acquired by the incremental path sensor. The sum of the reference measure and reference offset is stored in a buffer in front of the second counter. On reaching the index pulse the buffer content is transferred to the second counter for the purpose of the sole position determination by the incremental path sensor.

With the method according to the invention on the one hand the switching-over from the absolute to the incremental path sensor is effected in a controlled manner by the computation within the framework of its process cycle time without position loss. Before each switching-over procedure the reference value (reference measure+reference offset) for the second counter is continuously regenerated by the index pulse. Position losses or adulteration by way of electrical disturbing influences may in particular with continuous operation of the press be avoided and thus also corresponding reading errors.

The invention is hereinafter described in more detail by way of an embodiment example shown in the drawings.

FIG. 1 shows schematically a powder press with path sensors.

Figure 2A:
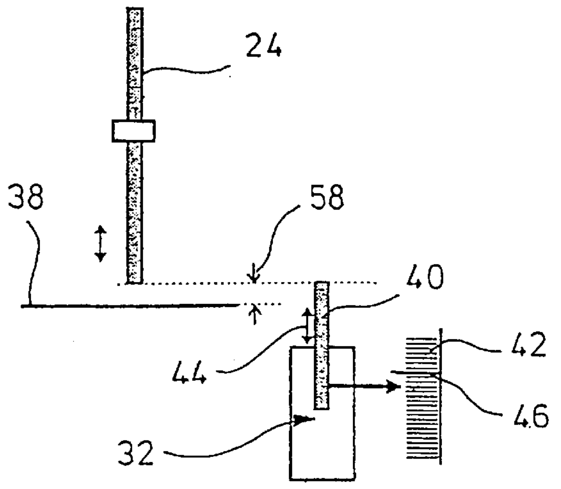

FIG. 2*a* shows a first representation of a setting of a reference position of the press according to FIG. 1.

Figure 2B:
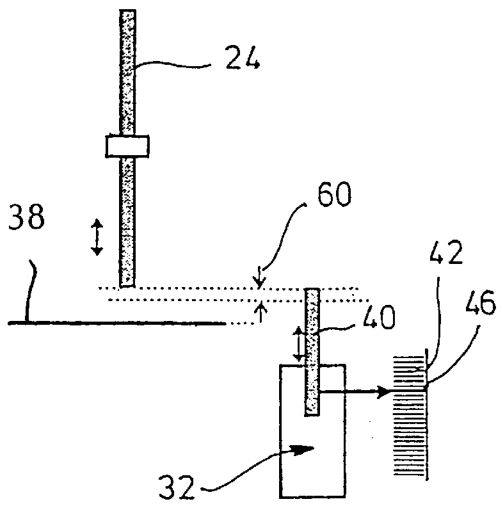

FIG. 2*b* shows a representation of a second reference position setting of the press according to FIG. 1.

Figure 3:
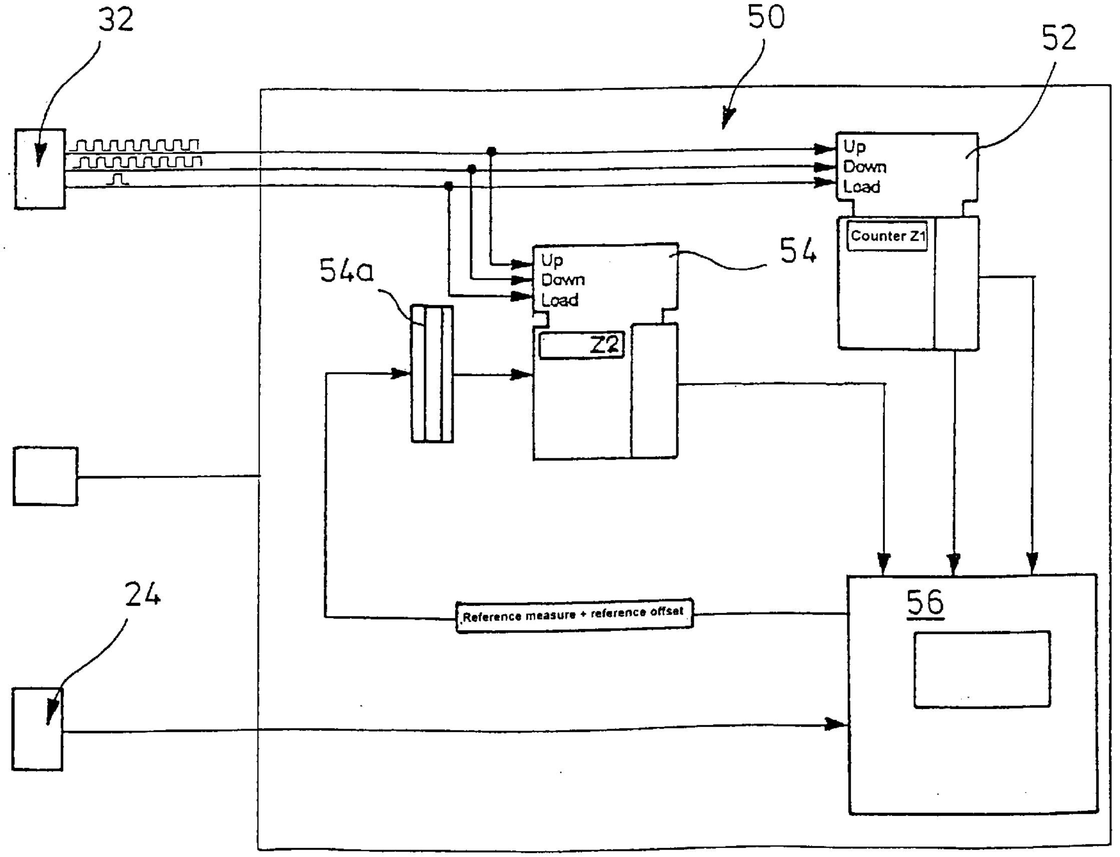

FIG. 3 shows a block diagram of the computer function units for the position determination of the press according to FIG. 1.

In a machine frame indicated at 10 and not described further there are mounted an upper pressing cylinder 12 and a lower pressing cylinder 14. Each pressing cylinder comprises a piston 16 and 18 for actuating a punch 20 and 22 respectively, To the cylinders 12 and 14 there are allocated an absolute path sensor 24 and 26 respectively. The upper punch 20 includes an extension arm 28 and the lower punch 22 includes an extension arm 30. The extension arms 28, 30 cooperate with an incremental path measuring system 32.

The upper punch 20 and the lower punch 22 cooperate with a die 34 which is arranged in a die table 36. At 38*a* there is indicated a pressed part which arises by the cooperation of the punches 20, 22 and for example consists of metal powder.

In FIGS. 2*a* and 2*b* there is indicated the upper absolute path sensor 24 as well as its position above the die upper edge 38. One further recognizes the incremental path sensor 32 with a feeler 40 which is actuated by the extension arm 28. At 42 there is indicated a scale by way of which it is to be illustrated that with an adjustment of the feeler 40 along the double arrow 44 per scale marking there is produced one pulse. At 46 in the scale 42 there is indicted a so-called index pulse, whose importance is yet to be described hereinafter.

In FIG. 3 a computer is to be recognized at 50 which comprises a first counter 52 or Z1 and a second counter 54 or Z2. A buffer 54*a* is connected in front of the counter Z2. In a block 56 there is provided an adding and comparison unit in which there is also stored a reference measure.

Before the computer 50 may carry out a position evaluation of the punch, for example of the punch 20 according to FIG. 1, it is given a reference measure for the punch 20.

For setting the reference position the punch is traversed by the cylinder 12 to a so-called reference measure 58 (FIG. 2*a*). This is effected with the help e.g. of a special gauge, whose dimension is produced with a high accuracy. Moreover with a calibration gauge the position of the punch relative to the die upper edge 38 may be checked. In the computer 50 the reference measure is stored. For the absolute path sensor 24 according to this command the absolute position is fixed at all times.

The cylinder 12 traverses the punch upwards with a low speed until the incremental path sensor 32 has reached the index pulse 46. The counter Z1 acquires the count pulses from the reference measure to the index pulse. The number of these pulses or the distance is indicated in FIG. 2*b* at 60 and hereinafter is also specified as reference offset. The sum of the reference measure 58 and reference offset is formed in the computer and is stored in the buffer 54*a*.

At the beginning of the pressing procedure the upper and lower punch 20, 22 are located at a relatively large distance from the die 34. In this phase the absolute path sensor 24 and 26 transmits the actual position to the computer 50. Simultaneously each millisecond there takes place a comparison of the computer between the count of counter Z2 of the incremental path sensor 32 and the sum measure (reference measure+reference offset). If the value of the counter Z2 is smaller than the sum measure the computer deduces the actual position from the counter 22 and as a result functions exclusively with the highly accurate incremental measuring sensor.

Shortly before reaching the sum measure by the punch the extension arm 28 or 30 comes into contact with the incremental path sensor 32. Via the then produced index pulse this activates the counter Z2 for accommodating the content of the buffer 54*a* (reference measure+reference offset).

If the punch 20 is moved further in the direction of the die upper edge 38, the count of the counter of Z2 is reduced and after the above described comparison the incremental measuring system for positioning is active.

What is claimed is:

1. A method for determining the position of a punch with respect to a die in a powder press comprising the following steps:

storing a reference measure in a computer corresponding to a predetermined relatively small distance of a punch to one of an upper edge and a lower edge of a die, storing a reference offset in the computer corresponding to a number of pulses counted from an incremental path sensor actuated by the punch on raising the punch from the reference measure to an index pulse, measuring a position of the punch above the reference using an absolute path sensor which evaluates the path of an adjusting piston for the punch and whose readings are inputted into the computer and inputting the pulses of the incremental path sensor into the computer as soon as the actual position of the punch is equal or smaller than the sum of the reference offset and the reference measure.

2. The method according to claim 1, characterized in that a first counter acquires the number of pulses which are produced with the traversing of the punch from the reference measure up to the reference offset and a second counter acquires the actual position of the incremental path sensor, the sum of the reference measure and reference offset is stored in a buffer in front of a second counter and on reaching the index pulse the buffer contents are transmitted to the second counter for the purpose of a sole position determination by the incremental path sensor.

* * * * *

UNITED STATES PATENT AND TRADEMARK OFFICE
CERTIFICATE OF CORRECTION

PATENT NO. : 6,442,859 B1
DATED : September 3, 2002
INVENTOR(S) : Jurgen Hinzpeter et al.

It is certified that error appears in the above-identified patent and that said Letters Patent is hereby corrected as shown below:

<u>Column 4,</u>
Line 14, after "measuring a position of the punch above the reference" please insert -- offset --.

Signed and Sealed this

Twenty-fourth Day of December, 2002

JAMES E. ROGAN
*Director of the United States Patent and Trademark Office*